United States Patent [19]

Takubo et al.

[11] Patent Number: 4,801,932
[45] Date of Patent: Jan. 31, 1989

[54] DISPLAY APPARATUS

[75] Inventors: Yoneharu Takubo, Neyagawa; Yasutaka Horibe, Ibaraki; Nobue Yamanishi, Higashiosaka; Eiji Fujii, Neyagawa; Hideyuki Okinaka, Toyonaka, all of Japan

[73] Assignee: Matsushita Electric Industrial Co., Ltd., Osaka, Japan

[21] Appl. No.: 869,907

[22] Filed: Jun. 3, 1986

[30] Foreign Application Priority Data

Jun. 4, 1985 [JP] Japan ................................ 60-121785
Jul. 12, 1985 [JP] Japan ................................ 60-154621
Jul. 15, 1985 [JP] Japan ................................ 60-155404

[51] Int. Cl.$^4$ .......................... G02F 1/03; G09F 9/00
[52] U.S. Cl. ................................ 340/783; 340/757; 350/392
[58] Field of Search ............... 340/783, 787, 788, 757, 340/763; 350/374, 392, 393; 365/109, 117, 121, 122

[56] References Cited

U.S. PATENT DOCUMENTS

| | | | |
|---|---|---|---|
| 3,292,171 | 12/1966 | Wilson | 340/787 |
| 3,540,209 | 11/1970 | Zutsky et al. | 350/392 |
| 3,591,939 | 7/1971 | McGregor | 340/788 |
| 3,614,200 | 10/1971 | Taylor | 365/121 |
| 3,901,584 | 8/1975 | Yamazaki | 350/392 |
| 3,955,191 | 5/1976 | Teraishi | 340/757 |
| 4,158,201 | 6/1979 | Smith et al. | 340/783 |

Primary Examiner—Marshall M. Curtis
Assistant Examiner—Alvin Oberley
Attorney, Agent, or Firm—Wenderoth, Lind & Ponack

[57] ABSTRACT

A display apparatus using a light-transmitting ceramic having an electrooptic effect. A voltage application head has at least a pair of electrodes which contact the light-transmitting ceramic. The head is driven by a head driver so as to scan across a surface of the light-transmitting ceramic. Electrodes may be formed also on the surface of the light-transmitting ceramic. A bright and dark pattern caused by double refraction in the light-transmitting ceramic is seen through a polarizing plate.

17 Claims, 4 Drawing Sheets

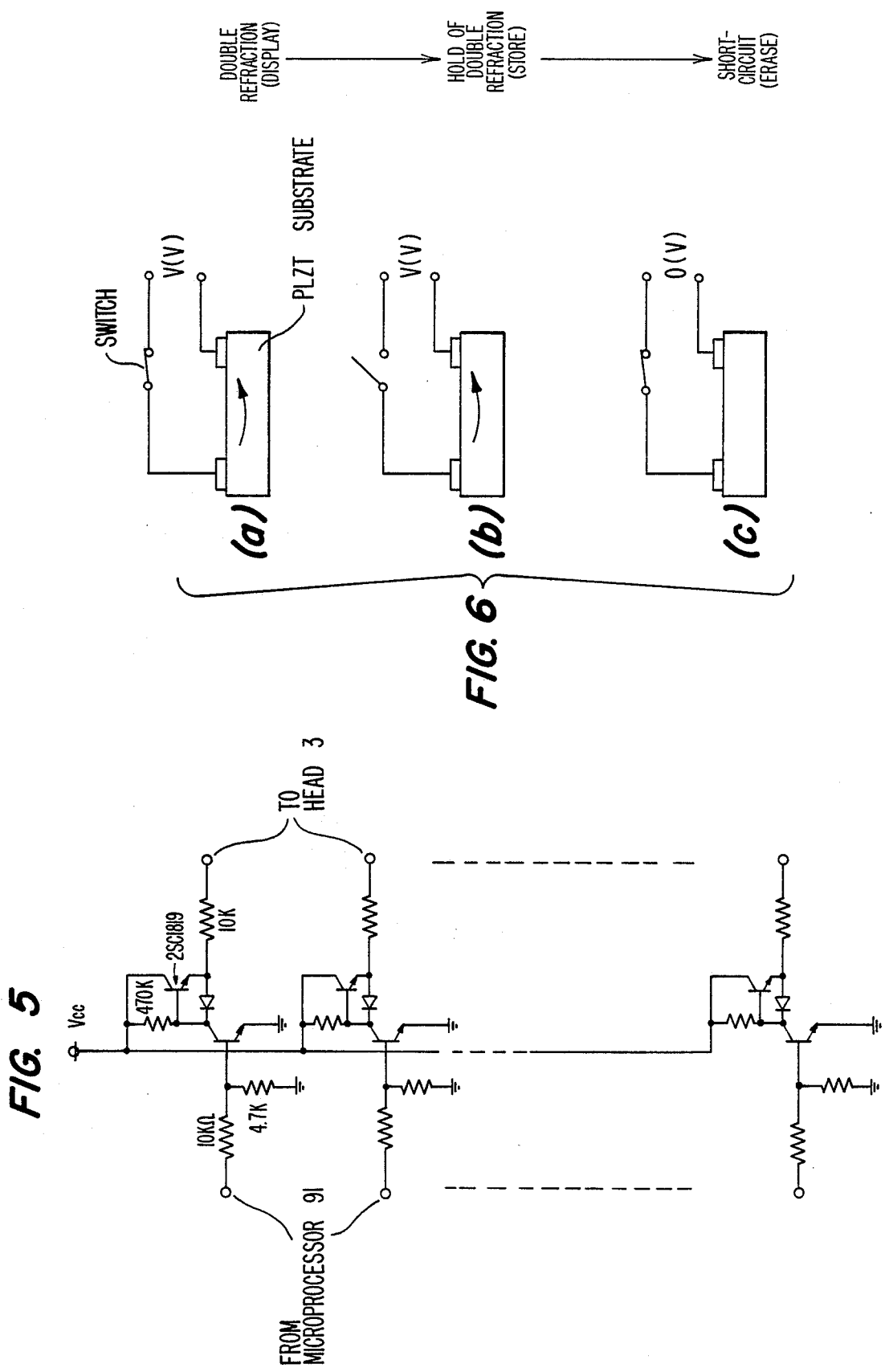

DISPLAY APPARATUS

BACKGROUND OF THE INVENTION

1. Field of the Invention

The present invention relates to an information display apparatus used for an output terminal of an information processing system.

2. Description of the Prior Art

In recent years, information communications technology has made rapid progress, such as optical communication, information network system (INS) and value-added network (VAN). With the progress of such communications technology, information output terminal equipment has been developed. Utilized as the output terminal equipment and vigorously developed these days are soft copies represented by CRTs and liquid-crystal displays (LCDs) and hard copies such as printers.

Since the CRTs and LCDs themselves have no storage function, the amount of information which can be displayed in one frame without dazzling the human eyes is limited. In particular, flat-plate type displays using a liquid crystal or the like have the following problems (although they can be reduced overall size in contrast to the CRT displays). Namely, since the flat-plate type displays are driven by means of matrix electrodes, an increase in the amount of information displayed in one frame causes an increase in the number of required drive circuits, resulting in exceedingly high costs.

On the other hand, output apparatuses such as printers are capable of recording (although the information display speed thereof is relatively slow). Therefore, these output apparatuses provide a satisfactory information display capacity per frame and a relatively high resolution. However, it is necessary to carry out maintenance of expendable supplies, such as ink, toner and the like, and such devices do not enable rewriting of a hard copy on which information has already been output.

As described above, conventional information output terminal apparatuses include those which enable rewriting of information but per se possess no memory function and therefore have a relatively small information display capacity per frame and unsatisfactory resolution, such as CRTs and LCDs, and those which can record and hold information but need maintenance and do not enable rewriting of information, such as printers. As a means which has the functions of both of the above-described two types of information output terminal apparatuses, a sheet which enables writing of information using electrophoresis has already been proposed (A. Chiang, D. Curry, M. Zarzychi: A Stylus Writable Electrophoretic Display Device., SID 79 Digest, pp. 45-46 (1979)), but this cannot be put into practical use because of its complicated structure.

SUMMARY OF THE INVENTION

In view of the above-described circumstances, it is a primary object of the present invention to provide a display apparatus which enables necessary information to be recorded, displayed and held for a necessary period of time and with a satisfactory picture quality at a reduced cost and a reduced power consumption and which enables rewriting of information.

To this end, the present invention provides a display apparatus in which a voltage application head having at least a pair of electrodes is arranged to scan across a surface of a voltage-controlled light-transmitting ceramic plate which exhibits the Kerr effect, thereby allowing a potential difference to be partially applied to the surface of the ceramic plate.

By virtue of the above-described arrangement, the voltage application head scans across the surface of the voltage-controlled light-transmitting ceramic plate which exhibits the Kerr effect, and a potential difference is thereby applied between any desired two local points on the surface of the ceramic plate so as to cause double refraction of light, thereby allowing information to be displayed through a polarizing plate. Since the voltage application head is adapted to scan, the potential difference occurring on the surface of the ceramic plate is preserved and maintained as it is by virtue of the dielectric property of the ceramic plate. In other words, the displayed information is held. When the surface of the ceramic plate is scanned with the voltage application head in a manner similar to the above but without applying any voltage to the ceramic plate surface, the potential difference held on the plate surface is canceled, that is, the displayed information can be erased.

Thus, the arrangement of the display apparatus according to the present invention enables information to be recorded, displayed and rewritten, and substantially no electric power is needed through any of the recording, displaying and rewriting operations. In addition, it is possible to realize a display system with an exceedingly simple arrangement and to display information with a high resolution at a reduced cost.

BRIEF DESCRIPTION OF THE DRAWINGS

FIG. 5 is a circuit diagram of a head driver in the control circuit section illustrated in FIG. 4;

FIG. 6 shows principles of basic recording, displaying and erasing operations of the display apparatus according to the present invention;

DESCRIPTION OF THE PREFERRED EMBODIMENTS

Figure 1:
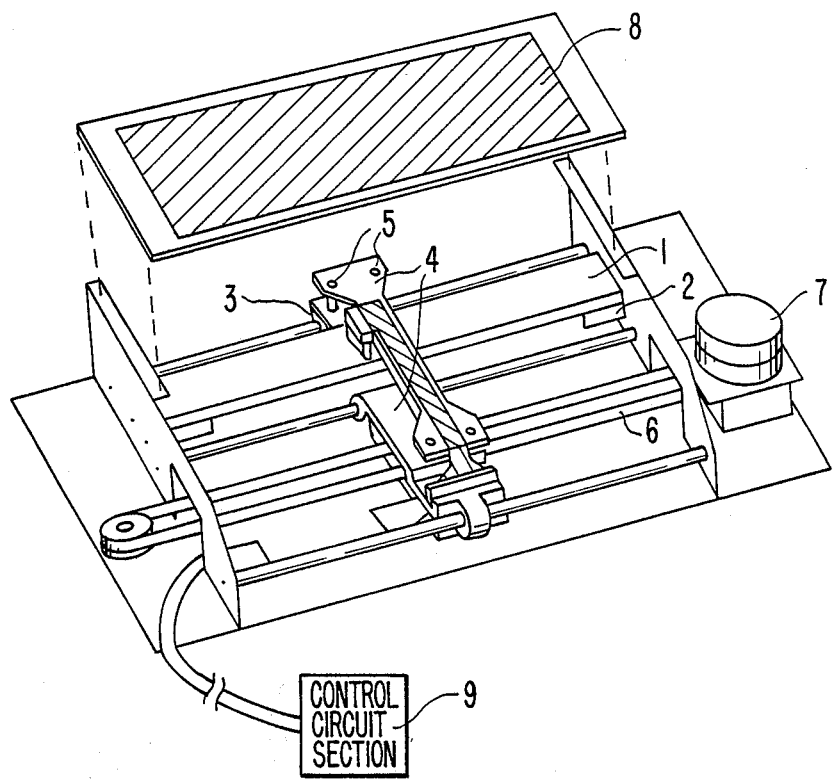
FIG. 1 shows a perspective view of a display apparatus in accordance with an embodiment of the present invention.

Referring first to FIG. 1 which shows an arrangement of a display apparatus in accordance with an embodiment of the present invention, reference numeral 1 denotes a display section constituted by a light-transmitting ceramic which exhibits the electrooptic effect known as the Kerr effect. In this embodiment, PLZT (Pb, La) (Zr, Ti) $O_3$) having a composition (La/Zr-/Ti=9/65/35) which provides a relatively large Kerr effect is employed for the display section 1. Reference numeral 2 denotes a plate for supporting the display section 1. A voltage application head 3 has a plurality of belt-shaped electrodes at the distal end thereof. Reference numeral 4 denotes a head securing plate for securing the voltage application head 3, and numeral 5 denotes adjusting screws for making the head 3 and the display section 1 contact each other uniformly. A belt 6 is attached to the bottom of the head securing plate 4 so that the plate 4 can be moved laterally by rotating a motor 7 forwardly or reversely. The head 3 is thereby moved to scan across the display section 1. A polarizing plate 8 is disposed above the upper surface of the display section 1 so that the axis of polarization of the plate 8 intersects the direction of scanning by the voltage application head 3 at 45°. A control circuit section 9 controls the voltage application head 3 and the motor 7.

Figure 2:
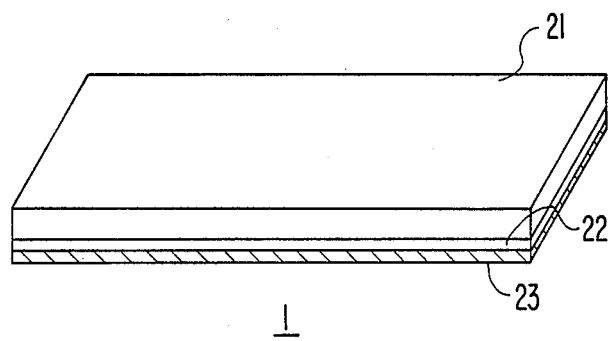
FIG. 2 shows a perspective view of a display section of the display apparatus illustrated in FIG. 1.

FIG. 2 shows an arrangement of the display section 1 which is illustrated in FIG. 1 and constituted by a flat PLZT plate. In FIG. 2, reference numeral 21 denotes a flat PLZT plate, and numeral 22 denotes a polarizing film attached to the lower surface of the plate 21. The polarizing film 22 is disposed so that the axis of polarization thereof coincides with the axis of polarization of the polarizing plate 8 shown in FIG. 1. A reflecting film 23 is provided on the lower surface of the polarizing film 22. An evaporation film of aluminum is employed as the film 23 in this embodiment.

Figure 3:
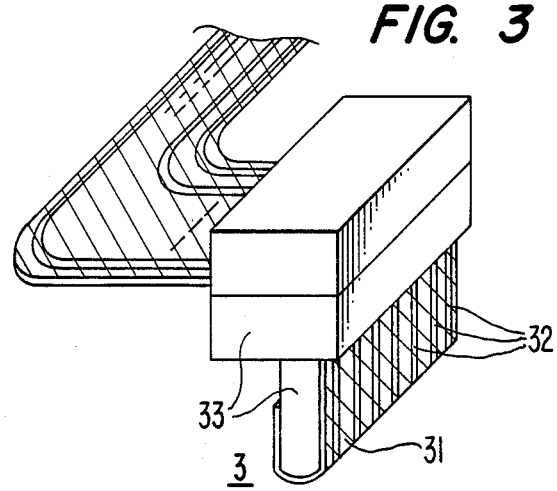
FIG. 3 shows a perspective view of a voltage application head section of the display apparatus illustrated in FIG. 1.

FIG. 3 shows a structure of the voltage application head 3 illustrated in FIG. 1. In FIG. 3, reference numeral 31 denotes a flexible sheet which is constituted by a polyimide resin in this embodiment. A group of electrodes 32 are formed on the sheet 31. Reinforcing members 33 are bonded to the flexible sheet 31 so that the sheet 31 is secured. In this structure, a reference voltage 0(v) is applied to every other one of the electrodes in the electrode group 32, and any desired voltage is applied to the remaining electrodes. The electrodes 32 produced in accordance with this embodiment each have an electrode width of 50($\mu$m), and a distance between adjacent electrodes is 100($\mu$m).

Figure 4:
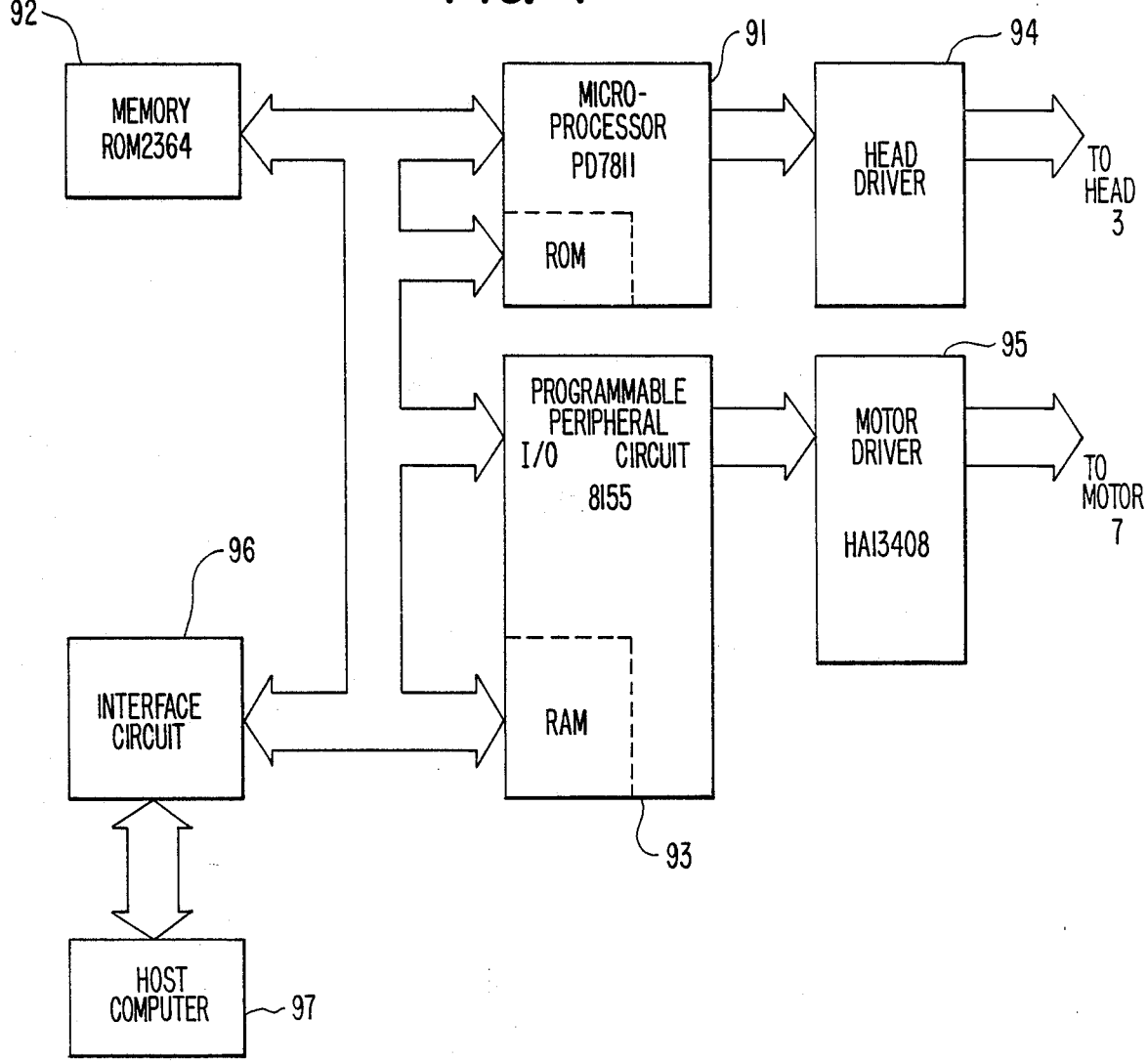
FIG. 4 is a block diagram showing an arrangement of a control circuit section of the display apparatus illustrated in FIG. 1.

FIG. 4 is a block diagram of the control circuit section 9 shown in FIG. 1 employed in this embodiment. As illustrated, the control circuit section 9 is constituted by a microprocessor ($\mu$PD7811) 91 as a main component, with a memory (ROM 2364) 92 and input/output control circuits 93, 96. A motor driver (HA13408) 95 is connected to a peripheral I/O circuit (8155) 93 for controlling the motor 7 shown in FIG. 1. A signal which is delivered to the voltage application head 3 is generated in such a manner that an 8-bit data output signal from the microprocessor 91 is passed through a head driver 94 so as to be boosted. FIG. 5 shows one example of the head driver 94 employed in this embodiment. The microprocessor 91 is connected to a host computer 97 through an interface circuit 96.

The following is a description of the operation of the display apparatus in accordance with the present invention, arranged as detailed above.

FIG. 6 shows the principle of the function of the PLZT element in the display apparatus according to the present invention. As illustrated in FIG. 6, when a voltage is applied between a pair of opposing electrodes formed on the PLZT substrate, double refraction occurs on the PLZT substrate. Accordingly, if polarizing films are respectively disposed on the upper and lower sides of the PLZT substrate, bright and dark patterns are respectively formed on a portion of the PLZT substrate on which double refraction occurs and the other portion (the state shown in FIG. 6($a$)). In other words, information can be displayed. Then, if a switch is opened in a state wherein a voltage is being applied to the PLZT substrate as shown in FIG. 6($b$), the double refraction generated in the PLZT substrate is held as it is, that is, the information is stored. The stored information can be erased by shorting the electrodes as shown in FIG. 6($c$).

Utilizing the characteristics of the PLZT element such as those described above, the reference voltage 0(v) is applied to every other one of the electrodes in the electrode group 32 shown in FIG. 3, while any desired voltage is applied to the remaining electrodes, and at the same time, the head securing plate 4 shown in FIG. 1 is moved by the action of the motor 7 so that the head 3 scans across the display section 1, thereby bringing about a display state and a storing state. More specifically, a voltage is applied to any desired electrodes of the voltage application head 3 from the control circuit section 9 shown in FIG. 1 for any desired period of time, thereby applying a potential difference to a portion of the flat PLZT plate 21 on the surface of the display section 1 and thus giving rise to a display state. At this time, the voltage application head 3 is made to scan in a state wherein the voltage is being applied to the electrodes 32 and therefore, the area of contact between the electrodes 32 and the PLZT plate 21 moves. However, the portion of the PLZT plate 21 along the locus of the movement of the contact area is brought into a state wherein a voltage is once applied and the switch is then opened, that is, the same state as that shown in FIG. 6($b$). Accordingly, information is displayed and stored. When the display apparatus in accordance with this embodiment in an information storing state was left at a room temperature for three days, no change occurred in the storing state. The information thus displayed and recorded can be erased by similarly moving the voltage application head 3 so as to scan across the display section 1 with the reference voltage 0(v) applied to all the electrodes 32. The display contrast on the display section 1 in this embodiment was more than 10. In addition, an optimal voltage which is applied to the electrodes 32 during display was 200(v).

Although the above-described embodiment of the present invention exemplifies a refraction type display apparatus, the present invention is not necessarily limited to the refraction type structure, and it will be understood that a similar function can be provided by a transmission type structure in which the reflecting film 23 in the structure of the display section 1 shown in FIG. 2 is removed, and a light is applied from the lower surface of the display section 1.

Figure 7:
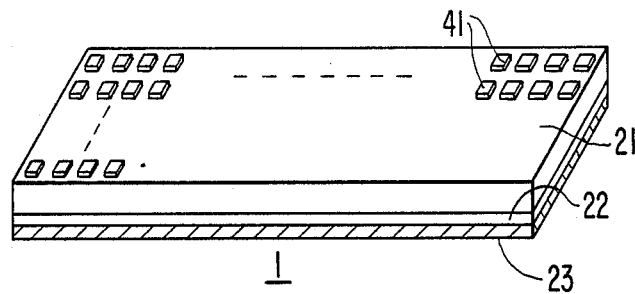
FIG. 7 shows a perspective view of a modified display section of the display apparatus illustrated in FIG. 1.

FIG. 7 shows a modified arrangement of the display section 1. Reference numeral 41 denotes a plurality of transparent electrode pieces formed on the surface of the flat PLZT plate 21. In this arrangement, an $In_2O_3$-$SnO_2$(ITO) transparent electrode is deposited on the surface of the PLZT plate 21 by evaporation and then formed into small square pieces of 50($\mu$m)$\times$50($\mu$m) which are arranged at intervals of 50($\mu$m) by photolithography technique. A potential difference is applied to the PLZT plate 21 through the electrode pieces 41 from the voltage application head 3. Accordingly, the PLZT plate 21 is not directly contacted and rubbed by the voltage application head 3, so that the problem of wearing and flawing caused by the contact therebetween will not be caused. The results of a repeated scanning test which was actually performed on the arrangement of this embodiment showed no change in the PLZT plate 21 and the voltage application head 3 even after more than 2,000 times of scannings had been carried out. In addition, since the double refraction occurring on the PLZT plate 21 is divided in the units of 50($\mu$m), the blur of dots is also somewhat remedied.

Figure 8:
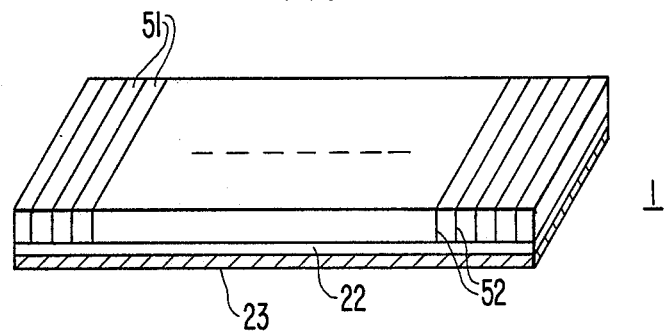
FIG. 8 shows a perspective view of another modified display section of the display apparatus illustrated in FIG. 1.

FIG. 8 shows another modified arrangement of the display section 1. Reference numeral 51 denotes a plurality of PLZT ceramic strips, and numeral 52 denotes bonding layers each bonding each pair of adjacent PLZT ceramic strips 51. Reference numerals 22 and 23 respectively denote a polarizing film and a reflecting film which are similar to those in FIG. 2. The PLZT ceramic strips 51 and the bonding layers 52 are arranged at a pitch of 120($\mu$m), the former having a width of 100($\mu$m), and the latter having a width of 20($\mu$m). The structure of electrodes formed on the voltage application head 3 is the same as that in FIG. 3. The PLZT ceramic strips 51 are periodically arranged through the bonding layers 52. Therefore, the dots in a display state are effectively and reliably separated from each other at the period of arrangement of the PLZT ceramic strips 51 with respect to the scanning direction and at the electrode pitch on the voltage application head 3 in a direction perpendicular to the scanning direction, whereby the display quality can be improved. For instance, in the case of a PLZT plate which is designed such as that in FIG. 2, it has experimentally been found that the maximum number of dots per millimeter that can be resolved in the scanning direction is 8, whereas the arrangement in FIG. 8 enables such limitation on the number of resolvable dots to be eliminated.

Figure 9:
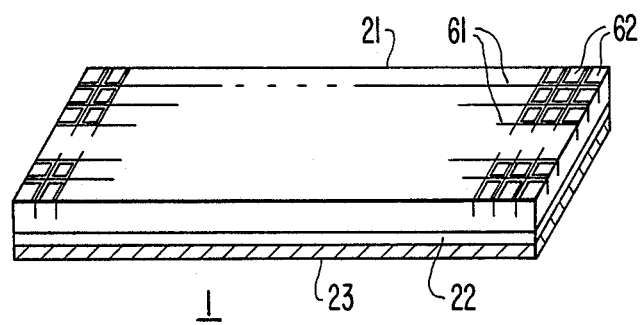
FIG. 9 shows a perspective view of still another modified display section of the display apparatus illustrated in FIG. 1.

FIG. 9 shows still another modified arrangement of the display section 1. Reference numeral 61 denotes a net-like electrode formed on the surface of the PLZT plate 21, and numeral 62 denotes an insulating film formed so as to completely cover the electrode 61 alone. In this arrangement, the shape of each segment of the net-like electrode is square. As an electrode material, an ITO transparent electrode is employed. The width of the electrode is 50($\mu$m), and the dimensions of each segment are 150($\mu$m)$\times$150($\mu$m). As an insulating film for coating, a polyimide resin (Semicofine: Toray Industries, Inc.), which can be patterned by photolithography technique, is employed.

The net-like electrode 61 is formed in such a manner that, after a resist had been applied to the surface of the PLZT plate, the resist and the PLZT plate are partially cut to form grooves, and an ITO electrode is deposited by evaporation and then subjected to lift-off so that the ITO electrode is left only inside the grooves. The insulating film is formed by photolithography technique. The structure of electrodes formed on the voltage application head 3 is the same as that in FIG. 3. The net-like common electrode 61 is formed on the PLZT plate, so that all the electrodes on the voltage application head 3 can be utilized as signal lines. Accordingly, the resolution of displayed characters can be made double compared with that in the case of the arrangement in FIG. 2 without changing the pitch of the electrodes on the voltage application head 3. In addition, the dots can be completely isolated from each other by the net-like electrode, so that it is possible to display characters without any blur.

Figure 10:
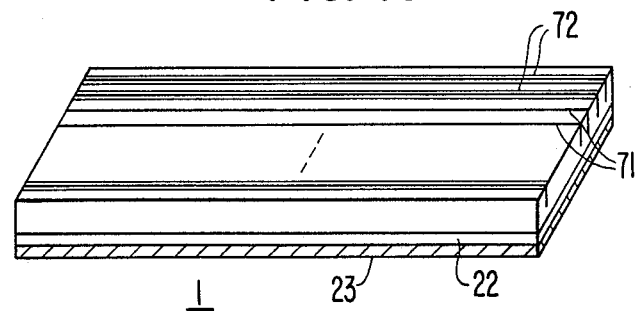
FIG. 10 shows a perspective view of yet another modified display section of the display apparatus illustrated in FIG. 1.

FIG. 10 shows yet another modified arrangement of the display section 1. In this arrangement, common electrodes are formed on the PLZT plate. As will be understood from FIG. 10, belt-like transparent electrodes 71 are formed parallel to the scanning direction of the voltage application head 3. The surface of each of the belt-like transparent electrodes 71 is coated with an insulation film 72. In this arrangement, all the electrodes on the voltage application head 3 can be utilized as signal lines, and it is therefore possible to realize an improvement in resolution. In addition, the structure of electrodes provided on the PLZT plate is simplified.

The display characteristic of the display apparatus in accordance with the invention were examined. When a voltage of 120(v) was applied to the electrodes of the voltage application head, the display contrast reached the maximum, and the value was 1:8.

What is claimed is:
1. A display apparatus comprising:
    a light-transmitting ceramic plate having an electrooptic effect;
    a polarizing plate disposed facing one major surface of said light-transmitting ceramic plate;
    a polarizing film provided on the other major surface of said light-transmitting ceramic plate;
    a reflecting film provided on said polarizing film;
    a voltage application head movable across said one major surface of said light-transmitting ceramic plate and having at least a pair of electrodes between which a voltage is applied, said electrodes being in contact with said one major surface of said light-transmitting ceramic plate so as to cause said light-transmitting ceramic plate to produce a double refraction at a portion where said voltage is applied through the contacted electrodes, the portion at which the double refraction is produced being seen through said polarizing plate as a displayed image;
    a head driving means for moving said voltage application head so as to scan said one major surface of said light-transmitting ceramic plate; and
    a control means for controlling said head driving means and for supplying said voltage application head with said voltage.

2. The apparatus according to claim 1, wherein said light-transmitting ceramic is PLZT ((Pb, La) (Zr, Ti) O$_3$).

3. The apparatus according to claim 1, wherein said voltage application head has a plurality of electrodes arranged perpendicularly to a scanning direction of said head.

4. The apparatus according to claim 1, wherein a spacing between each pair of adjacent electrodes formed on said voltage application head is larger than the width of each of the plurality of transparent electrode pieces formed on the surface of said light-transmitting ceramic.

5. A display apparatus comprising:
    a light-transmitting ceramic plate having an electrooptic effect and being provided on one major surface thereof with a plurality of transparent electrode pieces which are not in contact with each other;
    a polarizing plate disposed facing said one major surface of said light-transmitting ceramic plate;
    a polarizing film provided on the other major surface of said light-transmitting ceramic plate;
    a reflecting film provided on said polarizing film;

a voltage application head movable across said one major surface of said light-transmitting ceramic plate and having at least a pair of electrodes between which a voltage is applied, said electrodes being in contact with a part of said plurality of transparent electrode pieces so as to cause said light-transmitting ceramic plate to produce double refraction at a portion where said voltage is applied through said electrodes and said part of said plurality of electrode pieces which respectively contact each other, the portion at which the double refraction is produced being seen through said polarizing plate as a displayed image;

a head driving means for moving said voltage application head so as to scan said one major surface of said light-transmitting ceramic plate; and a control means for controlling said head driving means and for supplying said voltage application head with said voltage.

6. The apparatus according to claim 2, wherein said light-transmitting ceramic is PLZT ((Pb, La) (Zr, Ti) $O_3$).

7. The apparatus according to claim 2, wherein said voltage application head has a plurality of electrodes arranged perpendicularly to a scanning direction of said head.

8. A display apparatus comprising:
a light-transmitting ceramic plate having an electrooptic effect comprising a flat plate formed by strips of a light-transmitting ceramic having an electrooptic effect arranged parallel to one another and joined together;

a polarizing plate disposed facing one major surface of said light-transmitting ceramic plate;

a polarizing film provided on the other major surface of said light-transmitting ceramic plate;

a reflecting film provided on said polarizing film;

a voltage application head movable across said one major surface of said light-transmitting ceramic plate and having at least a pair of electrodes between which a voltage is applied, said electrodes being in contact with said one major surface of said light-transmitting ceramic plate so as to cause said light-transmitting ceramic plate to produce a double refraction at a portion where said voltage is applied through the contacted electrodes, the portion at which the double refraction is produced being seen through said polarizing plate as a displayed image;

a head driving means for moving said voltage application head so as to scan said one major surface of said light-transmitting ceramic plate; and a control means for controlling said head driving means and for supplying said voltage application head with said voltage.

9. The apparatus according to claim 8, wherein each of said light-transmitting ceramic strips extend in a direction parallel to a scanning direction of said voltage application head.

10. The apparatus according to claim 8, wherein said light-transmitting ceramic is PLZT ((Pb, La) (Zr, Ti) $O_3$).

11. The apparatus according to claim 8, wherein said voltage application head has a plurality of electrodes arranged perpendicularly to a scanning direction of said head.

12. A display apparatus comprising:
a light-transmitting ceramic plate having an electrooptic effect and provided on the surface thereof with electrodes connected thereto in a net-like pattern, said electrodes having an insulating film formed thereon so as to completely cover only said electrodes;

a polarizing plate disposed facing one major surface of said light-transmitting ceramic plate;

a polarizing film provided on the other major surface of said light-transmitting ceramic plate;

a reflecting film provided on said polarizing film;

a voltage application head movable across said one major surface of said light-transmitting ceramic plate and having at least a pair of electrodes between which a voltage is applied, said electrodes being in contact with said one major surface of said light-transmitting ceramic plate so as to cause said light-transmitting ceramic plate to produce a double refraction at a position where said voltage is applied through the contacted electrodes, the portion at which the double refraction is produced being seen throug said polarizing plate as a displayed image;

a head driving means for moving said voltage application head so as to scan said one major surface of said light-transmitting ceramic plate; and a control means for controlling said head driving means and for supplying said voltage application head with said voltage.

13. The apparatus according to claim 12, wherein said light-transmitting ceramic is PLZT ((Pb, La) (Zr, Ti) $O_3$).

14. The apparatus according to claim 12, wherein said voltage application head has a plurality of electrodes arranged perpendicularly to a scanning direction of said head.

15. A display apparatus comprising:
a light-transmitting ceramic plate having an electrooptic effect and provided on a surface thereof with a plurality of spaced-apart belt-shaped electrodes which are arranged at predetermined intervals, said electrodes having an insulating film formed thereon so as to completely cover only said electrodes;

a polarizing plate disposed facing one major surface of said light-transmitting ceramic plate;

a polarizing film provided on the other major surface of said light-transmitting ceramic plate;

a reflecting film provided on said polarizing film;

a voltage application head movable across said one major surface of said light-transmitting ceramic plate and having at least a pair of electrodes between which a voltage is applied, said electrodes being in contact with said one major surface of said light-transmitting ceramic plate so as to cause said light-transmitting ceramic plate to produce a double refraction at a portion where said voltage is applied through the contacted electrodes, the portion at which the double refraction is produced being seen through said polarizing plate as a displayed image;

a head driving means for moving said voltage application head so as to scan said one major surface of said light-transmitting ceramic plate; and a control means for controlling said head driving means and for supplying said voltage application head with said voltage.

16. The apparatus according to claim 15, wherein said lighttransmitting ceramic is PLZT ((Pb, La) (Zr, Ti) $O_3$).

17. The apparatus according to claim 15, wherein said belt-shaped electrodes are formed so as to extend parallel to a scanning direction of said voltage application head which has a plurality of electrodes arranged perpendicularly to the scanning direction.

* * * * *